United States Patent [19]

Hori et al.

[11] Patent Number: 5,062,098
[45] Date of Patent: Oct. 29, 1991

[54] OPTICAL PICK-UP DEVICE HAVING HOLOGRAPHIC ELEMENT

[75] Inventors: Yoshikazu Hori, Osaka; Makoto Kato, Nishinomiya, both of Japan

[73] Assignee: Matsushita Electric Industrial Co., Ltd., Osaka, Japan

[21] Appl. No.: 259,704

[22] Filed: Oct. 19, 1988

[51] Int. Cl.⁵ .............................................. G11B 7/12
[52] U.S. Cl. ................................. 369/112; 369/44.12
[58] Field of Search ............ 369/103, 112, 116, 44.12, 369/44.23, 44.14; 350/3.64, 348; 346/76 L

[56] References Cited

U.S. PATENT DOCUMENTS

| | | | |
|---|---|---|---|
| 4,654,839 | 3/1987 | Endo | 369/116 |
| 4,665,310 | 5/1987 | Heemskerk | 369/44.12 |
| 4,728,165 | 3/1988 | Powell et al. | 350/3.64 |
| 4,731,772 | 3/1988 | Lee | 369/44.14 |
| 4,733,065 | 3/1988 | Hoshi et al. | 369/44.12 |
| 4,794,585 | 12/1988 | Lee | 369/44.23 |

*Primary Examiner*—Donald McElheny, Jr.
*Attorney, Agent, or Firm*—Wenderoth, Lind & Ponack

[57] ABSTRACT

An optical pick-up device includes a semiconductor laser for emitting a laser beam, a focusing lens for focusing the laser beam emitted from the laser onto the surface of an optical medium, a holographic optical element having an anisotropic refractive index and located between the laser and the focusing lens, and a photodetector for receiving a diffracted laser beam from the holographic optical element. The holographic optical element, which may be formed of a liquid crystal or a lithium niobate crystal, transmits therethrough in an undiffracted manner the laser beam emitted from the semiconductor laser and diffracts only the reflected laser beam which has reflected off of the optical medium.

12 Claims, 4 Drawing Sheets

OPTICAL PICK-UP DEVICE HAVING HOLOGRAPHIC ELEMENT

BACKGROUND OF THE INVENTION

1. Field of the Invention.

The present invention relates to an apparatus for using a laser beam to record and/or read information, and more particularly, to an optical pick-up device applied to, for example, optical disk systems.

2. Description of the Related Art.

Optical memory system requirements are increasing, and relatively small optical pick-up devices of a low cost and high performance are in demand. The present invention presents an optical pick-up device for satisfying this demand. A conventional optical pick-up device for optical disk systems typically consists of a semiconductor laser, an optical lens for focusing the laser beam of the semiconductor laser onto an optical disk, a beam splitter for guiding a part of the laser beam reflected from the optical disk onto photodetectors, and a cylindrical lens for generating an astigma aberration in the laser beam reflected from the optical disk (Nakamura et al., National Tech. Report, Vol. 32, 490, 1986). Since a conventional optical pick-up device requires several optical components, as mentioned above, the size of the optical pick-up device is relatively large and the production costs, which include the cost of complicated optical axis adjustment, is high. In order to reduce the number of such optical components and to realize a relatively small and low cost optical pick-up device, a holographic type optical pick-up device, which employs a hologram which functions as both a beam splitter and cylindrical lens, was proposed by Kimura et al. (Proc. of the 22th Micro-Optics Conf. Vol. 14, 228, 1986). The schematic configuration of a proposed holographic type optical pick-up device is illustrated in FIG. 6. A laser beam emitted from a semiconductor laser 61 passes through a hologram 62, and is focused onto an optical disk 64 by a focusing convex lens 63. The laser beam is reflected off of the disk surface, the intensity of the reflected laser beam being in accordance with the recorded information, and the reflected laser beam returns towards the semiconductor laser 61 through the focussing lens 63 and the hologram 62. In this process, a part of the reflected laser beam is diffracted into two directions by the hologram 62 having the two regions R1 and R2, and the diffracted beams are respectively guided and focused onto a quadrant photodetector 65. By signal processing of the photo current of the quadrant photodetector 65, the recorded signal and focusing error and tracking error signals are detected.

In this conventional optical pick-up device, however, when the laser beam which is emitted from the semiconductor laser 61 passes through the hologram 62, a part of the laser beam power (typically 50%) is diffracted and lost. The transmitting power, which is utilized for reading and recording operations, and the power of the beam focused onto the photodetector, which affects the SN ratio during signal detection, are dependent on the diffraction efficiency. When the diffraction efficiency of the hologram 62 is high, the transmission efficiency is low, and the laser beam power focused onto the disk surface is thus relatively small, rendering it difficult to realize a sufficient power level to write or read information. On the other hand, when the diffraction efficiency is low, the laser beam power onto the photodetector is relatively small, rendering it difficult to obtain signals of a sufficiently high SN ratio. A diffraction efficiency of 50% is optimal for realizing the highest SN ratio. Moreover, in the latter case of the low diffraction efficiency, since the feedback power to the semiconductor laser is relatively large due to the low diffraction efficiency, the semiconductor laser oscillation may possibly become unstable and cause an increased intensity in fluctuation noise.

This invention is presented to overcome these problems and to provide a highly efficient, low noise, low cost, and small size optical pick-up device.

SUMMARY OF THE INVENTION

The optical pick-up device of the present invention includes a semiconductors laser, a focusing lens, an anisotropic hologram, and photodetectors.

According to the present invention, high optical beam utilization efficiency is realized by applying a uni-directional hologram system. In this system, the diffraction efficiency or loss in the optical path from the laser to the disk is small and the diffraction efficiency in the reflected optical path from the disk to the photodetector is high. The uni-directional hologram system is fundamentally realized by the combination of a grating formed on a material having an anisotropic refractive index and a phase shifter.

DETAILED DESCRIPTION OF THE INVENTION

The present invention is based on the principle that holographic grating, which is fabricated using a crystal having an anisotropic refractive index, provides for diffraction anisotropy. The diffraction efficiency is in the polarization direction of the laser beam. When the polarization direction of the laser beam reflected from the optical disk is rotated 90 degrees, it is possible to realize a high diffraction efficiency for the reflected laser beam only, without a diffraction loss in the optical path from the laser to the disk. The schematic construction of an embodiment of the present invention is illustrated in FIG. 1.

Figure 6:
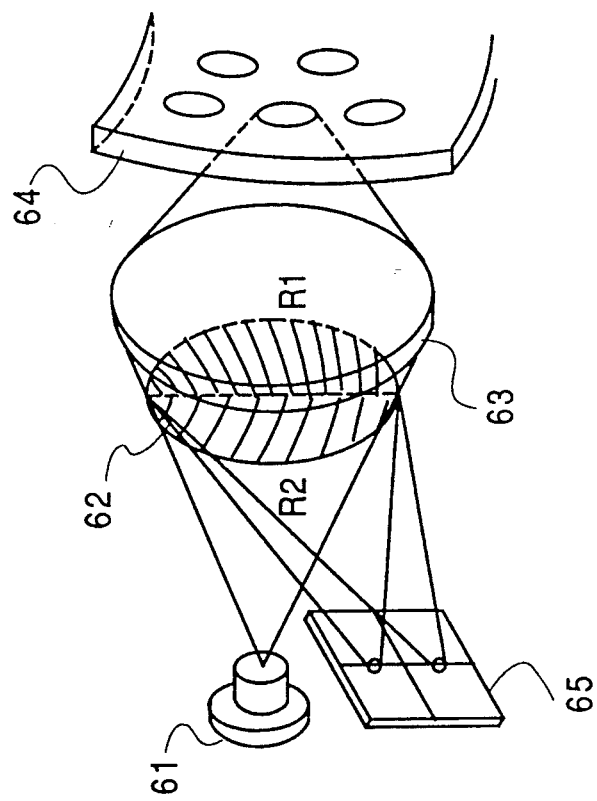
FIG. 6 is a schematic construction of a conventional holographic type optical pick-up device.
Figure 1:
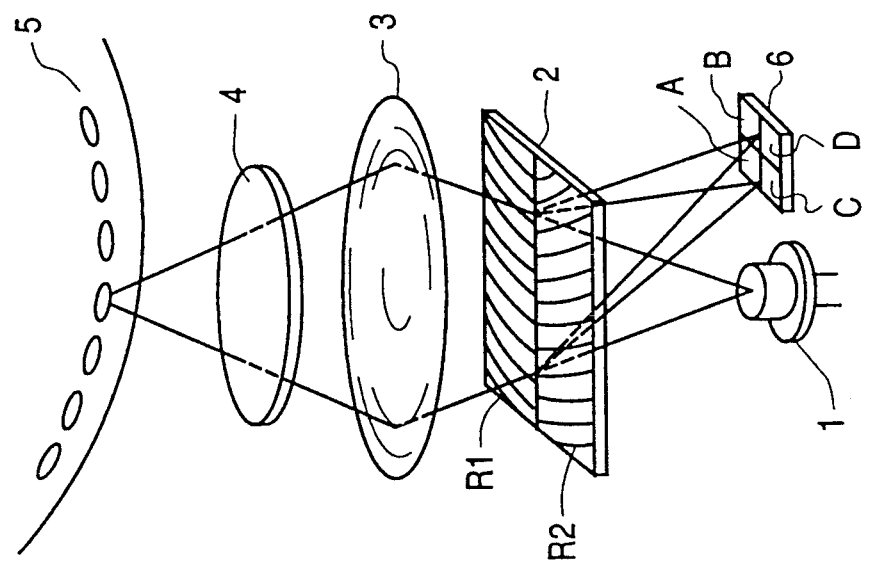
FIG. 1 is a schematic construction of the optical pick-up device of the present invention.
Figure 2A:
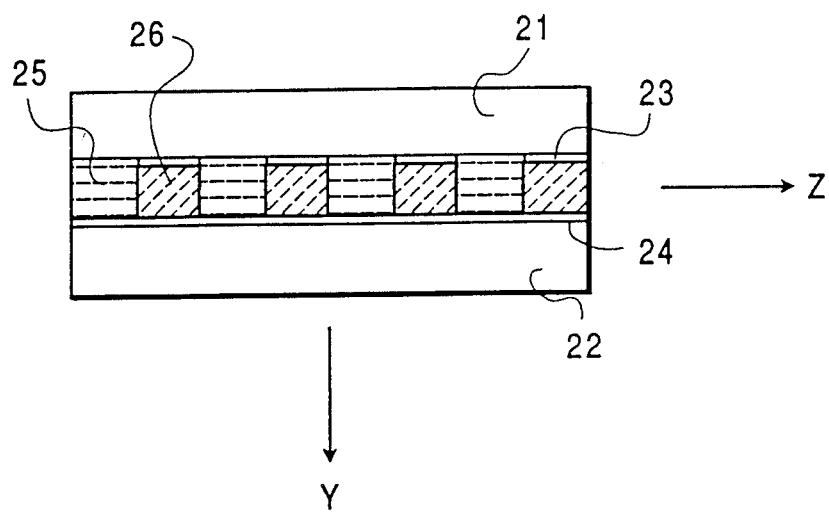
FIG. 2(a) is a cross section view of the liquid crystal cell, which is used to realize an anisotropic hologram.
Figure 2B:
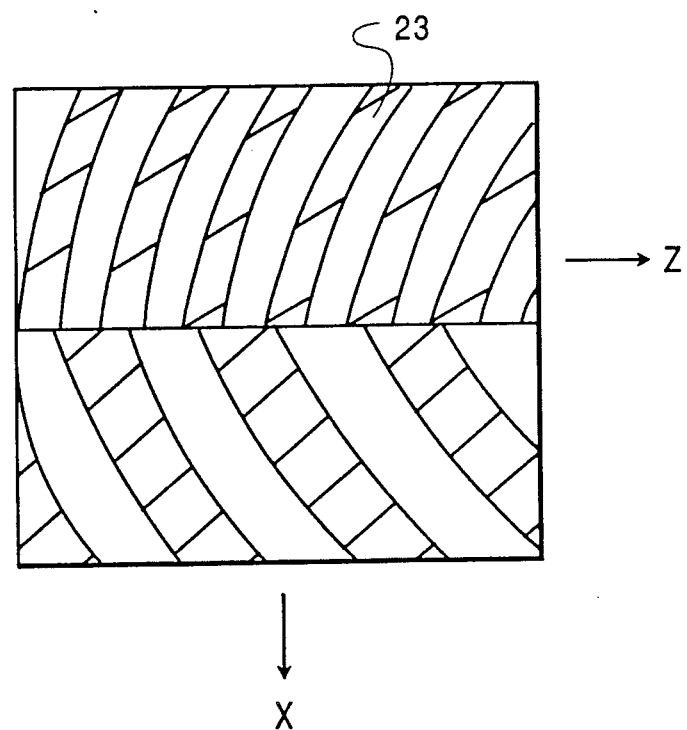
FIG. 2(b) depicts a pattern of the transparent electrode.

The optical pick-up device of FIG. 1 includes a semiconductor laser 1, an anisotropic hologram 2 fabricated using liquid crystal, a focusing lens 3, a quarter wave plate 4, and a quadrant photodetector 6. A schematic cross section view of the anisotropic hologram is depicted in FIG. 2(a) and the grating pattern of the hologram fabricated using a transparent electrode is illustrated in FIG. 2(b). In FIG. 2(a), reference numerals 21 and 22 denote transparent substrates, 23 denotes a transparent electrode having an intermittent structure corresponding to a specific hologram pattern, 24 denotes a common transparent electrode, and 25 and 26 denote nematic liquid crystal layers having a positive dielectric constant and optical axes which are initially aligned in a direction parallel to the substrates 21, 22. Reference numeral 26 denotes the liquid crystal region in which the optical axis is rotated in response to an applied electric field. In this case, the optical axis of the liquid crystal layer is in the horizontal direction (Z direction). When an electric field is applied between the grating electrode 23 and the common electrode 24, the alignment of the liquid crystal molecules is periodically changed, and diffraction occurs for a laser beam having a polarization axis which is parallel to the optical axis of the liquid crystal.

In this invention, the optical axis of the liquid crystal is aligned perpendicularly to the polarization direction of the laser beam emitted from the laser 1. The polarized light emitted from the semiconductor laser 1 transmits through the anisotropic hologram 2 without being diffracted, and is focused onto the optical disk 5 through the focusing lens 3 and quarter wave plate 4. Since the laser beam which has passed through the hologram 2 is not diffracted, almost the entire optical power radiated from the laser 1 is transmitted to the optical disk 5. The laser beam reflects off of the optical disk 5, again passes through the quarter wave plate 4 and the focusing lens 3, and reaches the hologram 2. Since the reflected laser beam has twice been transmitted through the quarter wave plate 4, the polarized plane of the laser beam has been rotated 90 degrees and the polarization axis of the reflected beam is parallel to the optical axis of the liquid crystal. Therefore, the reflected laser beam is diffracted and split by the hologram 2. FIG. 2(b) shows a top view of the transparent electrode 23 fabricated on an inner surface of the transparent substrate 21. The transparent electrode 23 pattern is fabricated using computer generated holographic technology. The optical axis of the liquid crystal is in the Z direction and the laser 1 emitted laser beam having its polarization axis in the X direction is transmitted through the hologram 2 and reflected off of the surface of the optical disk, and the reflected beam, having rotated 90 degrees, is diffracted by the hologram 2. The holographic pattern is composed of the two regions R1 and R2, and the diffracted beams are respectively focused onto two points of the photodetector 6 having quadrants A, B, C, and D as shown in FIG. 1. The read signal corresponding to the information recorded in the optical disk is detected as (IA+IB+IC+ID), and the tracking and focusing signals are detected as (IA+IB)−(IC+ID) and (IA+ID)−(IB+IC), wherein IA, IB, IC, and ID respectively denote the photo currents of regions A, B, C, and D. The optical intensity of the beams directed to the photodetector 6 by the hologram 2 is controlled by changing the diffraction efficiency of the hologram 2 for the reflected laser beam. The diffraction efficiency of the hologram in the optical return path does not affect the utilization efficiency of the laser beam transmitted to the optical disk.

Figure 3A:
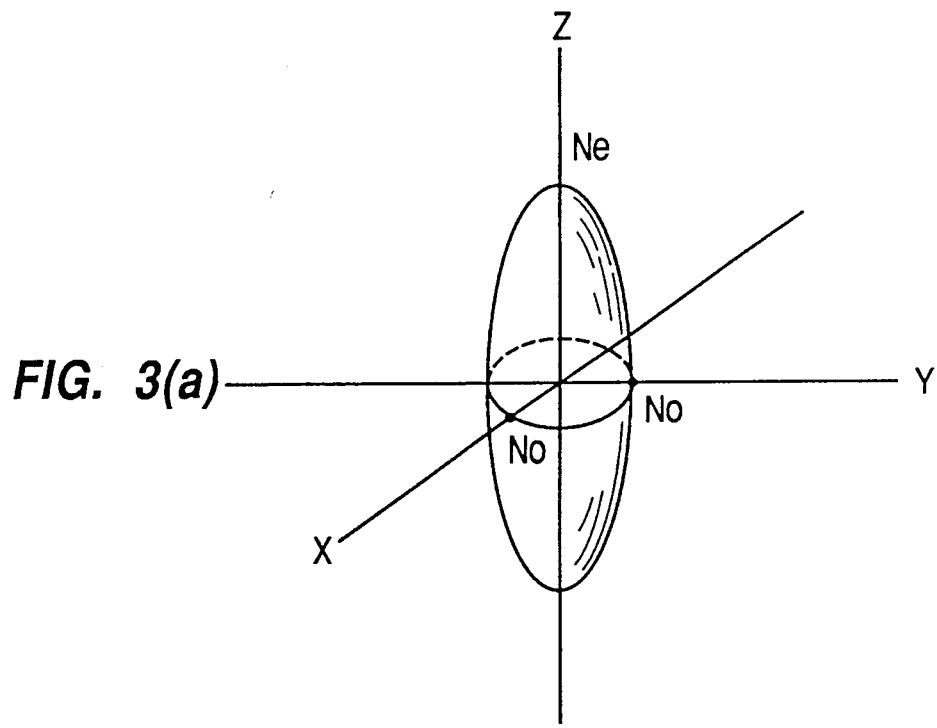
FIG. 3(a) and FIG. 3(b) depict refractive index ellipsoids of the liquid crystal which is used for fabricating an anisotropic hologram.
Figure 3B:
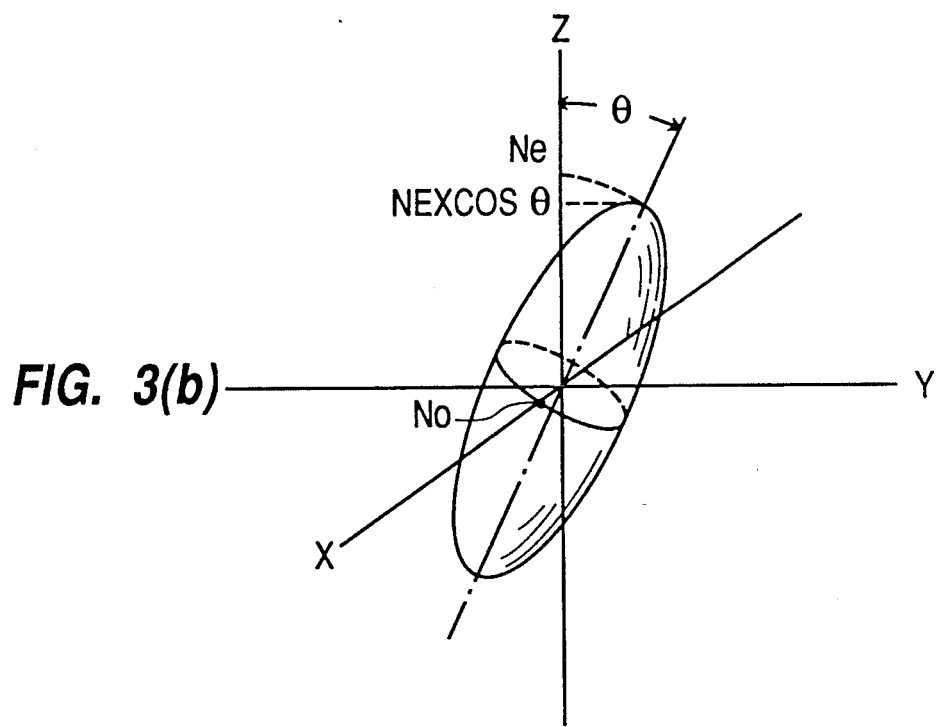

The principle of generating the diffraction anisotropy of the hologram according to this invention is explained with reference to FIG. 3. The refractive index ellipsoid of a uni-axial optical crystal, such as liquid crystal, is shown in FIG. 3. FIG. 3(a) illustrates the refractive index ellipsoid for the liquid crystal in which optical axis is aligned in the Z direction. In this case, the refractive index of the crystal is $N_e$ for the light having its polarization axis in the Z direction (extraordinary light), and $N_o$ for the light having its polarization axis in the X-Y plane (ordinary light). FIG. 3(b) illustrates the refractive index ellipsoid of the liquid crystal in which the optical axis is inclined from the Z direction by applying an electrical field to the homogeneously aligned liquid crystal. In this case, the refractive index for the light having its polarization axis parallel to the Z direction is $N_e \cos\Theta$, where $\Theta$ is the angle between the Z direction and the inclined optical axis, which is smaller than $N_e$, and the refractive index for the light having its polarization parallel to the X direction is $N_o$. For the optical beam propagating to the Y direction with its polarization direction in the X axis, the refractive index is $N_o$ for both FIG. 3(a) and (b). On the other hand, for the light beam propagating to the Z direction with its polarization direction in the Z axis, the refractive index of the crystal is different, i.e. $N_e$ for FIG. 3(a) and $N_e \cos\eta$ for FIG. 3(b). Therefore, the hologram having diffraction anisotropy is fabricated by alternately forming regions according to FIGS. 3(a) and (b), which is achieved by applying a spatially intermittent electric field to the liquid crystal layer.

As shown in FIG. 2(a), the laser emitted optical beam is input into the hologram along the Y direction and having a polarization axis which is perpendicular to the surface of FIG. 2(a), and diffraction does not significantly occur. On the other hand, the refractive indices of the intermittent regions with and without the applied voltage, causes the liquid crystal layer to act as a hologram for light having its polarization direction in the Z direction.

Since the inclination of the liquid crystal optical axis is controlled according to the applied electrical field, and the diffraction efficiency of the hologram is controlled as explained, the transmission of the laser beam may also be controlled. Therefore, the feedback intensity to the semiconductor laser is controlled to minimize the reflection noise of the optical pick-up device.

As explained above, a homogeneously aligned liquid crystal layer having a positive dielectric anisotropy is used. However, it is also possible to use a homeotropic aligned liquid crystal layer having a negative dielectric anisotropy. Also it is possible to use liquid crystal of a twist nematic type.

In the above described optical pick-up device, liquid crystal is used for the anisotropic hologram, but it is possible to use other crystals of a uni-axial optical material, such as lithium niobate.

Figure 4:
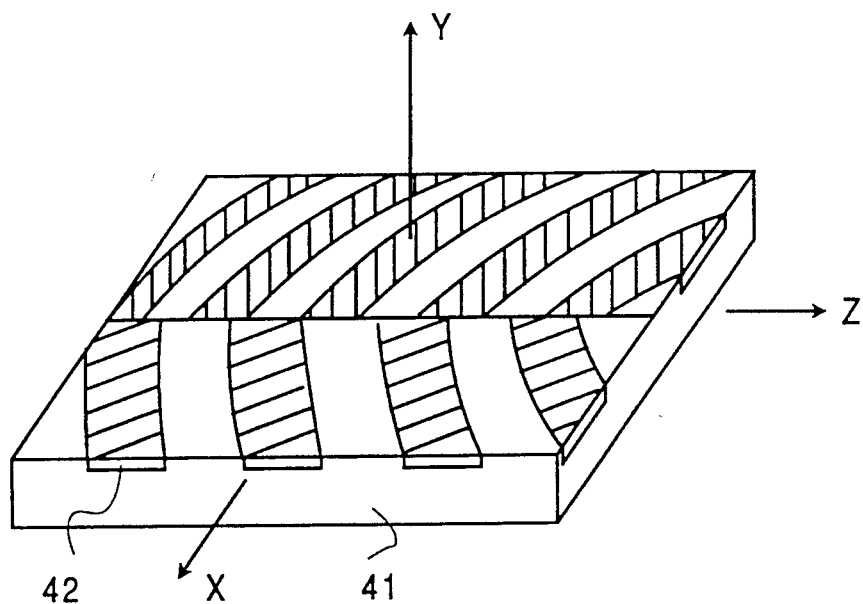
FIG. 4 is a view of an anisotropic hologram fabricated by lithium niobate.

FIG. 4 illustrates the schematic structure of the anisotropic hologram fabricated using Lithium Niobate. On the surface of a Y-cut Lithium Niobate substrate 41, a holographic grating structure Tantalum etching mask is fabricated using photo lithography and an intermittent region on the Lithium Niobate substrate surface is ion exchanged, whereby an intermittent structure having high and low refractive indices is fabricated. The refractive index of the ion exchanged region on the Y-cut surface is almost constant for light having its polarization axis in the X direction, and is increased for light having its polarization axis in the Z direction. Therefore, the device acts as a holographic grating for light having its polarization axis in the Z direction, and does not act as a grating for light having its polarization axis in the X direction. The device is therefore also applicable in the invention as illustrated in FIG. 1, in place of the liquid crystal device. The diffraction efficiency of the device is controlled according to the thickness of the ion exchanged depth. Shown in FIG. 4, a Y-cut substrate is used, by it is also possible to use an X-cut lithium niobate substrate. In this case, the device acts as a holographic device for light having its polarization axis in the Z direction and does not act as such for light having its polarization axis in the Y direction.

The optical pick-up device illustrated in FIG. 1 uses a quarter wave plate. However, it is possible to remove the quarter wave plate when the optical pick-up device is applied to an opto-magnetic disk system, since the polarization direction of the reflected light is rotated in accordance with the recorded information.

In the explanation of this invention as illustrated in FIG. 1, the focusing error signal is detected based on the knife edge method, and a hologram which splits the reflected laser beam into two directions is applied. However, it is also possible to apply a hologram which generates an astigma or conjugate beam, whereby the focusing error signals are detected based on an astigma method or spot size detection method. By using such holograms, a more simple structure of the optical pick-up device is possible.

Figure 5:
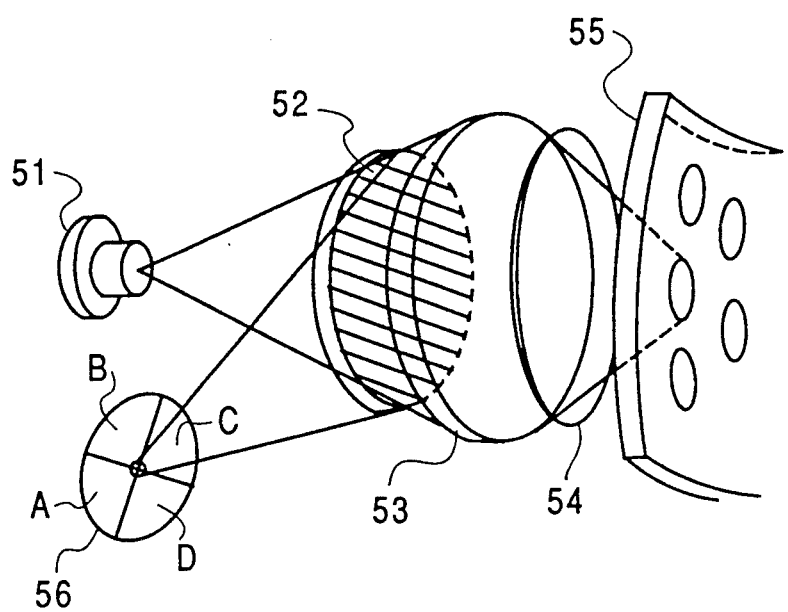
FIG. 5 is a schematic construction of another optical pick-up device of the present invention based on an astigma method for focusing signal detection.

FIG. 5 depicts a holographic type optical pick-up device based on the astigma method for focusing error signal detection. The astigma method is used in conventional optical pick-up devices, as explained already. The polarized laser beam emitted from the semiconductor laser 51 passes through the hologram 52, fabricated by liquid crystal or Lithium Niobate crystal, and is focused by the focusing lens 53 onto the surface of the optical disk 55 through a quarter wave plate 54. In this process, the laser beam passing through the holographic device is not diffracted, and almost the entire power of the emitted laser beam is applied to the surface of the disk. Then the laser beam reflected from the optical disk again passes through the quarter plate. The polarization direction of the reflected light which has passed through the quarter plate is rotated 90 degrees relative to the emitted beam. Therefore, the reflected laser beam is diffracted and focused onto the quadrant photo-detector having the regions A, B, C, and D. Here, the recorded information and tracking and focusing signals are respectively detected as (IA+IB+IC+ID), (IA+IB)−(IC+ID), and (IA+IC)−(IB+ID).

The higher efficiency and controllability of the diffraction efficiency of the device of FIG. 5 is the same as that of the device of FIG. 1. The holographic pattern is easily fabricated using the conventional holographic exposure method. The hologram type optical pick-up device based on the knife-edge method and astigma method is explained herein. However, it is clear that other methods, such as the spot size detection method, may also be applied.

We claim:

1. An optical pick-up device for directing laser energy onto an optical medium and for detecting laser energy reflected off of the optical medium, said optical pick-up device comprising:

laser emitting means for emitting a laser beam;

focusing means for focusing the laser beam emitted from said laser emitting means onto a surface of the optical medium, whereby a reflected laser beam is reflected off of the optical medium;

a holographic optical element, having an anisotropic refractive index and located between said laser emitting means and said focusing means, for transmitting therethrough in an undiffracted manner the laser beam emitted from said laser emitting means and for diffracting the reflected laser beam reflected off of the optical medium, whereby a thus diffracted laser beam is emitted from the holographic element; and photodetector means for receiving and detecting the diffracted laser beam from the holographic optical element.

2. An optical pick-up device as recited in claim 1, wherein the holographic optical element comprise a uni-axis optical crystal.

3. An optical pick-up device as recited in claim 2, wherein an optical axis of said holographic optical element is aligned perpendicular to a polarization axis of the laser beam emitted from said laser emitting means.

4. An optical pick-up device as recited in claim 1, wherein said holographic optical element includes a liquid crystal of which a molecular axis is uniformly aligned in parallel to a substrate of said liquid crystal and to which a spatially intermittent electrical field is applied.

5. An optical pick-up device as recited in claim 2, wherein said holographic optical element includes a liquid crystal of which a molecular axis is uniformly aligned in parallel to a substrate of said liquid crystal and to which a spatially intermittent electrical field is applied.

6. An optical pick-up device as recited in claim 3, wherein said holographic optical element includes a liquid crystal of which a molecular axis is uniformly aligned in parallel to a substrate of said liquid crystal and to which a spatially intermittent electrical field is applied.

7. An optical pick-up device as recited in claim 1, wherein said holographic optical element includes one of an X-cut and a Y-cut lithium niobate crystal of which a surface has been spatially intermittently ion exchanged.

8. An optical pick-up device as recited in claim 2, wherein said holographic optical element includes one of an X-cut and a Y-cut lithium niobate crystal of which a surface has been spatially intermittently ion exchanged.

9. An optical pick-up device as recited in claim 3, wherein said holographic optical element includes one of an X-cut and a Y-cut lithium niobate crystal of which a surface has been spatially intermittently ion exchanged.

10. An optical pick-up device as recited in claim 1, further comprising a quarter wave plate located between said holographic optical element and said focusing means so as to rotate the polarization direction of the reflected laser beam passing therethrough to a direction which is perpendicular to a polarization direction of the emitted laser beam.

11. An optical pick-up device as recited in claim 2, further comprising a quarter wave plate located between said holographic optical element and said focusing means so as to rotate the polarization direction of the reflected laser beam passing therethrough to a direction which is perpendicular to a polarization direction of the emitted laser beam.

12. An optical pick-up device as recited in claim 3, further comprising a quarter wave plate located between said holographic optical element and said focusing means so as to rotate the polarization direction of the reflected laser beam passing therethrough to a direction which is perpendicular to a polarization direction of the emitted laser beam.

* * * * *